US007701231B2

(12) United States Patent
Yonushonis et al.

(10) Patent No.: US 7,701,231 B2
(45) Date of Patent: Apr. 20, 2010

(54) APPARATUS, SYSTEM, AND METHOD FOR DETECTING CRACKING WITHIN AN AFTERTREATMENT DEVICE

(75) Inventors: Thomas M. Yonushonis, Columbus, IN (US); Randall J. Stafford, Columbus, IN (US); Edgar Lara-Curzio, Lenior City, TN (US); Amit Shyam, Knoxville, TN (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 322 days.

(21) Appl. No.: 11/688,697

(22) Filed: Mar. 20, 2007

(65) Prior Publication Data

US 2009/0108856 A1 Apr. 30, 2009

(51) Int. Cl.
*G01R 27/08* (2006.01)
*G01R 31/08* (2006.01)

(52) U.S. Cl. .................................... 324/718; 324/525

(58) Field of Classification Search ................ 324/718, 324/715, 713, 691, 649, 600, 693, 525; 95/4, 95/6, 7, 14, 18; 374/183, 185, 160
See application file for complete search history.

(56) References Cited

U.S. PATENT DOCUMENTS 5,227,731 A 7/1993 Prabhakaran et al.
5,952,836 A * 9/1999 Haake ........................ 324/718
5,969,260 A 10/1999 Belk et al.
6,826,906 B2 * 12/2004 Kakwani et al. .............. 60/303
7,123,031 B2 * 10/2006 Twerdochlib ............... 324/693
7,141,990 B2 * 11/2006 Bast et al. ................... 324/708
7,186,484 B2 * 3/2007 Hommen et al. .............. 430/22
2005/0188681 A1 * 9/2005 Emi et al. ..................... 60/277
2005/0235621 A1 * 10/2005 Kunieda et al. ............... 55/523
2006/0012375 A1 1/2006 Kelsey et al.
2006/0070357 A1 4/2006 Yonushonis et al.
2006/0283262 A1 12/2006 Smits et al.
2007/0022724 A1 * 2/2007 Gargano et al. ............... 55/523

FOREIGN PATENT DOCUMENTS

WO 02/14657 A1 2/2002

OTHER PUBLICATIONS

PCT International Search Report and Written Opinion, Jul. 14, 2008.

* cited by examiner

*Primary Examiner*—Hoai-An D Nguyen
(74) *Attorney, Agent, or Firm*—Kunzler Needham Massey & Thorpe

(57) ABSTRACT

An apparatus, system, and method are disclosed for detecting cracking in a particulate filter. The method may include providing an apparatus comprising an aftertreatment device with a substrate and a substrate surface, a conductive material forming a conduction path bonded to the surface of the substrate surface, and access points configured to allow a resistance measurement of the conduction path. The method may include measuring the resistance of the conduction path, and determining if one or more cracks have occurred on the substrate surface based on the resistance measurement. The method may further include labeling the degradation level of the aftertreatment device based on the indicated amount of cracking, and replacing the aftertreatment device with an equivalent aftertreatment device, based on the degradation level, after a service event.

27 Claims, 9 Drawing Sheets

204 Resistance value
110
Resistance module 202
Degradation module 206
208 Degradation value
Labeling module 210
212 Device degradation label
Event detection module 216
214 Stored degradation values
218 Degradation event
222 Post-event degradation value
Cracking history module 212
220 Pre-event degradation value
Fault module 224
226 Fault indicator

APPARATUS, SYSTEM, AND METHOD FOR DETECTING CRACKING WITHIN AN AFTERTREATMENT DEVICE

BACKGROUND OF THE INVENTION

1. Field of the Invention

This invention relates to aftertreatment devices for treating engine exhaust streams, and more particularly relates to detecting physical failures in aftertreatment devices.

2. Description of the Related Art

Emissions regulations for internal combustion engines have changed rapidly in recent years. To meet the new regulations, many engine manufacturers have had to install aftertreatment devices to reduce emissions in the exhaust gases, or to condition the exhaust gases to assist other aftertreatment devices. For example, particulate filters remove soot from the exhaust gases of a diesel engine, and diesel oxidation catalysts are sometimes used to generate temperature in the exhaust gas to assist a particulate filter in oxidizing the soot off of the filter.

Most aftertreatment devices experience thermal cycles during the operations of the engine. The thermal cycles may be intentional, for example during the removal of soot from a particulate filter, or unintentional such as when the engine experiences large changes in the required workload for the engine. As the aftertreatment devices experience thermal cycles, they generate a temperature gradient within the device. The temperature gradient within the device may cause stresses and over time can cause the aftertreatment device to fail.

A stress related failure within an aftertreatment device, such as a crack in the wall of the aftertreatment device, can be particularly difficult to detect. There are no direct measurements routinely used in real-time for applications to detect such failures. Even when an aftertreatment device is being serviced, it is difficult for a service technician to detect such a failure even if the technician has a reason to look for it.

The aftertreatment device typically comprises a core—such as cordierite or silicon carbide—wrapped in a mesh that fixes the core in place, and the whole device is typically covered by a sheet metal and/or stainless steel "can." A stress failure on a device occurs in the core, typically as radial cracking around the surface of the core, and is not visible to a technician merely handling the device. Therefore, the current detection failure schemes rely on either ultrasound or special visual inspection to determine whether an aftertreatment component has failed.

Ultrasound detection schemes are problematic because of the intentional porous nature of the aftertreatment devices, and the gaps in the surrounding mesh. The ultrasound frequency must be so low (causing a low resolution image), and the aftertreatment devices are so poorly configured for ultrasound analysis, that often only the most catastrophic failures can be detected. However, some aftertreatment devices are no longer design compliant—which can mean regulatory emissions thresholds are not being met—with only a few moderate cracks around the device.

Special visual inspections require optic tools allowing the technician to view the interior of channels within the aftertreatment device. The channels of the device may be packed with soot and/or debris, rendering the inspection difficult or impossible. A minimal check of the device may require checking hundreds of channels around the perimeter of an aftertreatment device by repeatedly inserting a tool designed to go into channels packed in at 200-300 cells per inch. The inspection procedure can damage the aftertreatment device, and is time consuming and costly under the best of circumstances.

These limitations in the current technology result the discovery of aftertreatment device failures only when a technician has a specific reason to suspect a failure, only at considerable expense, and often only after a device has failed far beyond a threshold of design compliance. These limitations also introduce the risks attendant with aftertreatment devices with hidden defects. For example, a service company may clean aftertreatment devices and swap them out for a dirty aftertreatment device in a customer vehicle. Under the current state of technology, there is a significant risk that one of the swapped aftertreatment devices may have a stress failure, penalizing either the customer or the service company according to which device has failed.

SUMMARY OF THE INVENTION

From the foregoing discussion, applicant asserts that a need exists for an apparatus, system, and method that detects cracking within an aftertreatment device with minimal expense and effort. Beneficially, such an apparatus, system, and method would detect cracking as a passive check without input from a technician.

The present invention has been developed in response to the present state of the art, and in particular, in response to the problems and needs in the art that have not yet been fully solved by currently available particulate filter systems. Accordingly, the present invention has been developed to provide an apparatus, system, and method for detecting cracks in a particulate filter that overcome many or all of the above-discussed shortcomings in the art.

An apparatus is disclosed for detecting cracking in an aftertreatment device. The apparatus may comprise an aftertreatment device comprising a substrate and a substrate surface. The apparatus may further comprise a conductive material forming at least one conduction path bonded to the substrate surface, and a at least two access points conductively coupled to the conduction path(s). The conduction path(s) may comprise a decal applied to the substrate surface, and/or a conductive path printed on the substrate surface.

The apparatus may comprise a controller that generates a device degradation label based on a resistance value between at least two of the access points. The controller may comprise a plurality of modules configured to functionally execute generating a device degradation label. The controller may have a resistance module, a degradation module, and a labeling module. The controller may also have an event detection module and a cracking history module.

The resistance module may be configured to interpret a resistance value between at least two of the plurality of access points. The degradation module may be configured to determine at least one degradation value for the aftertreatment device based on the resistance value. The labeling module may be configured to generate a device degradation label for the aftertreatment device based on the at least one degradation value. The event detection module may be configured to determine a degradation event occurrence based on the at least one degradation value, and the cracking history module may be configured to store a pre-event degradation value and a post-event degradation value in response to each degradation event occurrence. In one embodiment, the cracking history module may be configured to store a plurality of degradation values at specified time intervals.

A method is disclosed for detecting fractures in an aftertreatment device. The method may comprise providing an apparatus comprising: an aftertreatment device comprising a substrate and a substrate surface, a conductive material forming at least one conduction path bonded to the substrate surface, and a plurality of access points conductively coupled to the at least one conduction path. The method may further comprise measuring at least one resistance value between two of the plurality of access points and determining at least one degradation value for the aftertreatment device based on the at least one resistance value. In one embodiment, the degradation value may comprise a crack propagation index.

A system is disclosed for detecting cracking in an aftertreatment device. The system may comprise an internal combustion engine that produces exhaust gas as a byproduct of operation. The system may further include an apparatus for detecting cracking in an aftertreatment device. The controller in the apparatus may comprise an electronic control module (ECM) and/or a service tool configured to generate a device degradation label based on a resistance value. In one embodiment, a service technician may determine a resistance value by measuring a resistance across at least two access points, and identify a device degradation label based on the resistance value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 9, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
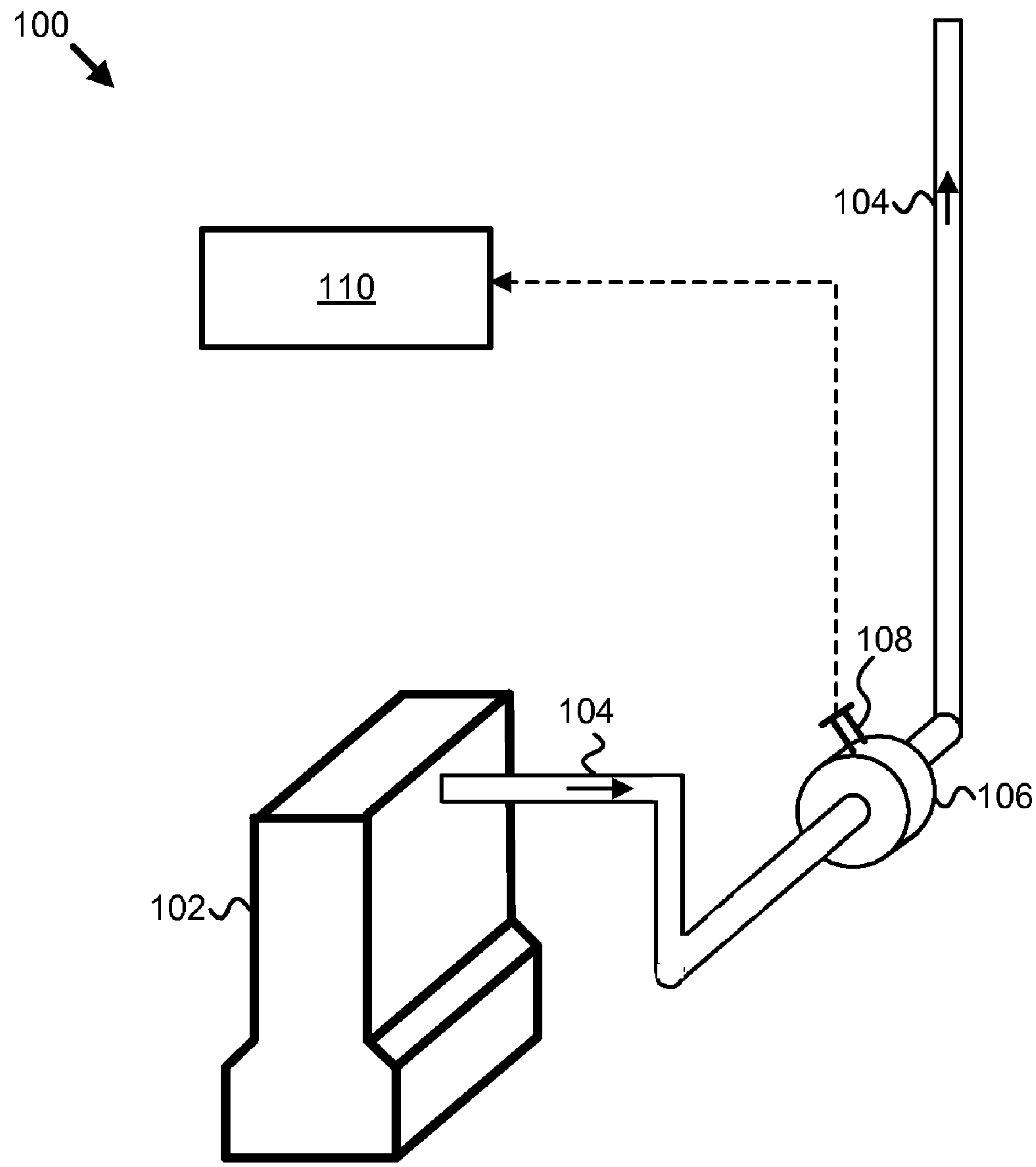
FIG. 1 is an illustration depicting one embodiment of a system for detecting cracking in an aftertreatment device in accordance with the present invention.

FIG. 1 is an illustration depicting one embodiment of a system 100 for detecting cracking in an aftertreatment device in accordance with the present invention. The system 100 comprises an internal combustion engine 102 that produces exhaust gas 104 as a byproduct of operation. For example, the engine 102 may be a diesel engine 102. The system 100 further comprises an aftertreatment device 106 configured to treat the exhaust gas 104. For example, the aftertreatment device 102 may comprise a particulate filter configured to remove particulates from the exhaust gas 104. The aftertreatment device 102 may comprise a substrate and a substrate surface. The substrate may comprise a ceramic core of the particulate filter and the substrate surface may comprise the outer surface of the ceramic core. In one embodiment, the aftertreatment device 106 may comprise a diesel oxidation catalyst, a $NO_x$ adsorption catalyst, and/or other aftertreatment devices 106 known in the art.

The system 100 further comprises a conductive material forming at least one conduction path bonded to the substrate surface, and a plurality of access points 108 conductively coupled to the at least one conduction path. The system 100 may further comprise a controller 110, which may be part of an electronic control module (ECM) and/or a service tool. The controller 110 may be configured to interpret a resistance value across the conduction path(s), and determine a degradation value based on the resistance value. The resistance value across the conduction path(s) may comprise a resistance between two of the access points 108. The ECM may be further configured to set a fault indicator based on the degradation value. In one embodiment, the ECM also comprises a controller for the engine 102. In one embodiment, a technician (not shown) measures at least one resistance value between two of the plurality of access points 108, and looks the measured resistance value(s) up in a table to determine at least one degradation value for the aftertreatment device 106 based on the resistance value(s).

Figure 2:
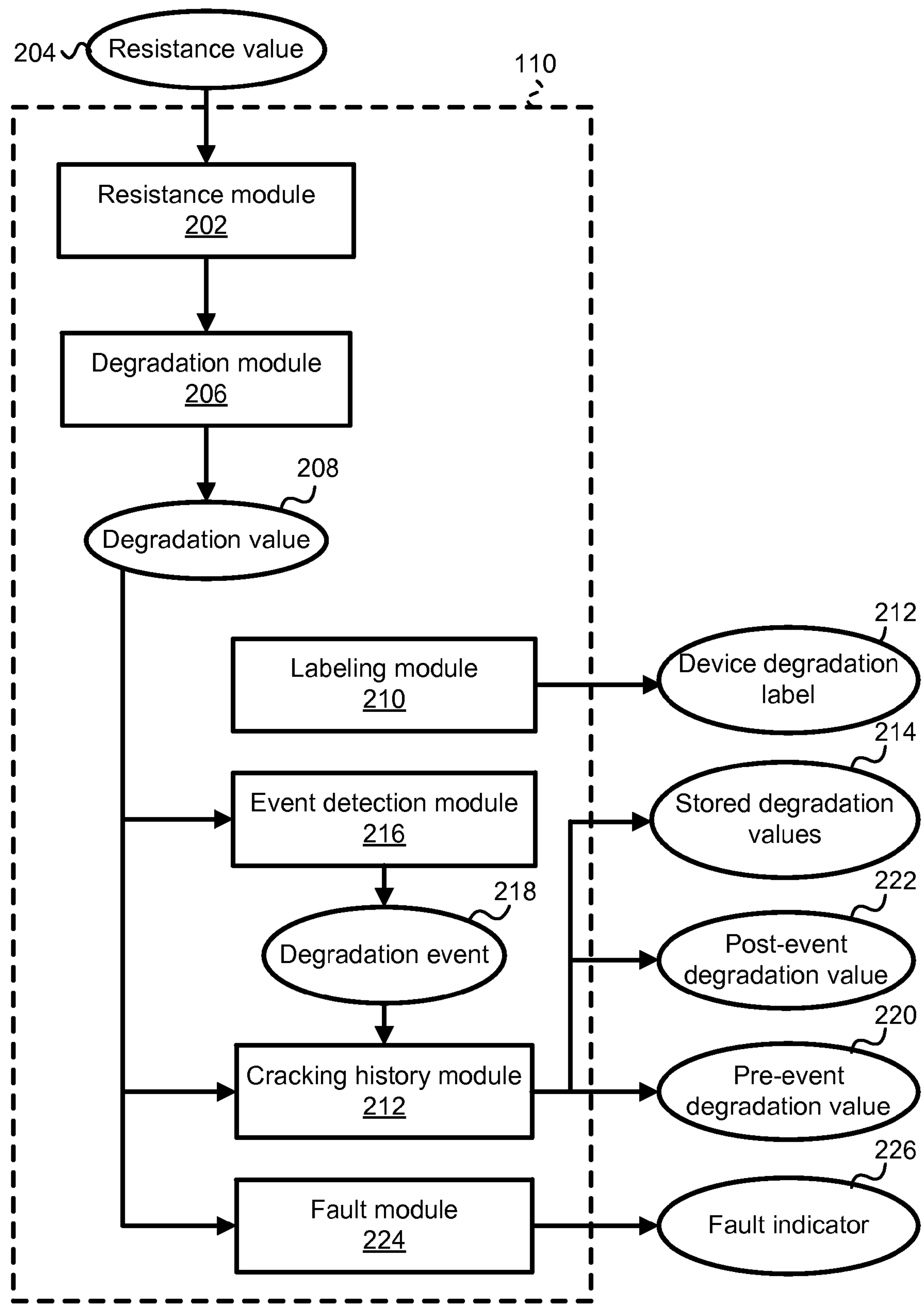
FIG. 2 is an illustration depicting one embodiment of a controller for determining a degradation value of an aftertreatment device based on a resistance value in accordance with the present invention.

FIG. 2 is an illustration depicting one embodiment of a controller 110 for determining a degradation value of an aftertreatment device 106 based on a resistance value in accordance with the present invention. The controller 110 may comprise a resistance module 206 configured to interpret a resistance value 204 across the conduction path(s). The resistance module 202 may interpret the resistance value 204 by reading a resistance value 204 from a datalink, by interpreting an electronic signal such as a voltage into a resistance value, accepting a user input, or other source known in the art. In one embodiment, the controller 110 is an ECM, and the ECM interprets the resistance value 204 by reading a voltage across the access points 108 to determine the resistance value 204 (e.g. in a voltage divider circuit utilizing a known supply voltage and a known pull-down resistor).

The controller 110 may further comprise a degradation module 206 configured to determine at least one degradation value 208 for the aftertreatment device 106 based on the resistance value 204. The degradation value(s) 208 may comprise a quantitative or qualitative description of the degradation level of the aftertreatment device 106. For example, the degradation value 208 may comprise an aftertreatment device indicator of "CRACKED" when the resistance value 204 indicates an open circuit (e.g. defined as a minimum resistance value 204 threshold), and an aftertreatment device indicator of "OK" when the resistance value 204 does not indicate an open circuit. In another embodiment, the degradation value 208 may comprise a crack propagation index based on the resistance value 204. For example, if the resistance value 204 indicates that 55% of a plurality of conduction paths are currently indicating an open circuit, the degradation module 206 may set the crack propagation index to fifty-five.

The controller 110 may further comprise a labeling module 210 configured to generate a device degradation label 212 for the aftertreatment device 106 based on the degradation value(s) 208. The device degradation label 212 may provide an indication of the remaining service life and/or degradation state of the aftertreatment device 106. For example, the device degradation label 212 may comprise a value from the list: "new," "minor degradation," "major degradation," and "failed." The labeling module 210 may be configured to select a device degradation label 212 according to the degradation value(s) 208 and a lookup table (not shown).

The controller 110 may further comprise a cracking history module 212 configured to store a plurality of degradation values 208 at specified time intervals. For example, the cracking history module 212 may be configured to store a degradation value 208 at the end of each day.

In one embodiment, the controller 110 may further comprise an event detection module 216, and the conduction paths may comprise a plurality of parallel conduction paths connecting at least two of the access points 108. The event detection module 216 may be configured to determine a degradation event 218 occurrence based on the degradation value(s) 208. A degradation event 218 may comprise a sudden change in the degradation value(s) 208, a high temperature event experienced by the aftertreatment device 106, a sudden temperature change experienced by the aftertreatment device 106, and/or any other change in the system 100 that may introduce the possibility of a degradation occurrence of the aftertreatment device 106.

The cracking history module 212 may be configured to store a pre-event degradation value 220 and a post-event degradation value 222 in response to a degradation event 218 occurrence. For example, the cracking history module 212 may store a rolling buffer of degradation values 208 comprising a few minutes of recent degradation value 208 history. In the example, when the event detection module 216 detects a degradation event 218, the cracking history module 212 may be configured to store the rolling buffer values as a pre-event degradation value 220, and a few minutes of incoming degradation values as a post-event degradation value 220.

The time scale of any rolling buffer and/or equivalent data memory technique should be selected according to the priorities of the system 100 as understood by one of skill in the art for the particular embodiment of the system 100. For example, in a system 100 where potential degradation events 218 occur quickly—such as a system requiring aggressive regeneration techniques to develop temperature in the aftertreatment device 106—the cracking history module 212 should be configured to store degradation values 208 frequently. In a system 100 where potential degradation events 218 occur slowly—such as a system that passively regenerates the aftertreatment device 106—the cracking history module 212 can be configured for a slower degradation value 208 storage frequency to conserve resources of the controller 110.

The controller 110 may further comprise a fault module 224 configured to set a fault indicator 226 based on the at least one degradation value 208. The fault indicator 226 may light a warning lamp on a vehicle, trigger data storage in an ECM 110 for use by a service technician, and the like.

Figure 3:
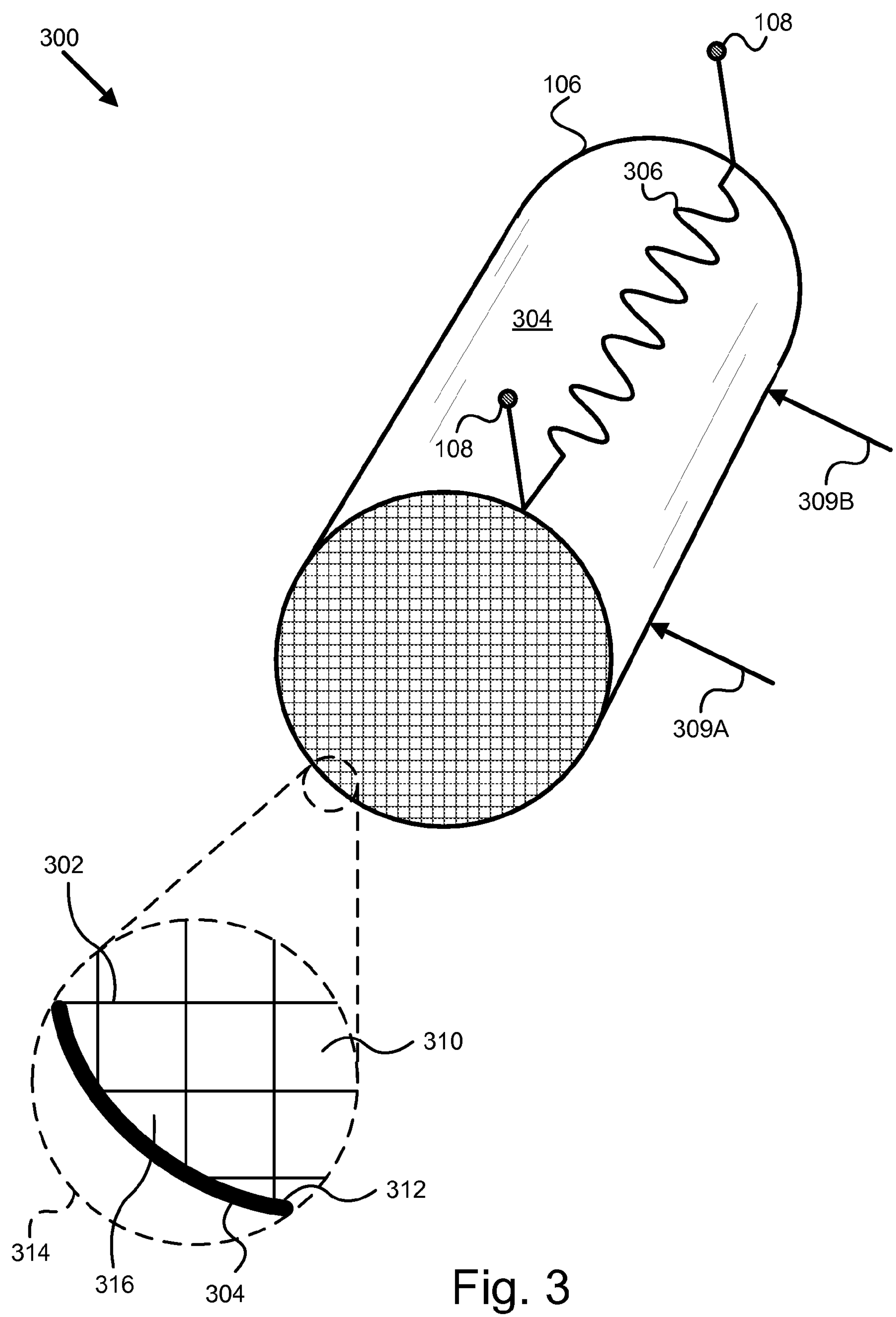
FIG. 3 is an illustration depicting one embodiment of an apparatus for detecting cracking in an aftertreatment device in accordance with the present invention.

FIG. 3 is an illustration depicting one embodiment of an apparatus 300 for detecting cracking in an aftertreatment device 106 in accordance with the present invention. The apparatus comprises an aftertreatment device 106 comprising a substrate 302 and a substrate surface 304. The substrate 302 may comprise a ceramic core, and the substrate surface 304 may comprise the outer surface of the ceramic core. The apparatus 300 further comprises a conductive material forming at least one conduction path 306 bonded to the substrate surface 304. The apparatus 300 may further comprise a plurality of access points 108 conductively coupled to the conduction path 306. In one embodiment, a resistance check between the access points 108 determines the resistance and continuity of the conduction path 306.

The conduction path 306 may comprise a conductive material printed on the surface 304—for example by an ink jet printer during manufacture of the aftertreatment device 106. In one embodiment, the conduction path 306 may comprise a conductive material painted on the surface 304. In one embodiment, the conduction path 306 may comprise a conductive material applied as a decal—for example painted or sprayed onto a mask. The conductive material may be baked onto the substrate surface 304 to set the material. In one embodiment, the conductive material is baked onto the substrate surface at about 850 degrees C. The conductive material may be baked on with an infra-red lamp. Other deposition techniques, such as screen printing, tape, laser jet deposition, thermal and/or plasma spraying, and the like are also contemplated within the scope of the present invention.

The conductive material may comprise a conductive cermet, or metal-ceramic alloy. Other substances may be used as are known in the art, and should have the properties of forming a resistive layer that conducts electricity and withstands the temperatures expected at the substrate surface 304 during system 100 operation. For example, silver, titanium, nickel, tungsten, and alloys of these and other metals may be used to for the conduction path 306. The conduction path 306 may further include a protective layer configured to protect the conduction path 306 from corrosion, oxidation, and other damage.

The conduction path 306 should be configured to break when a fracture or crack occurs on the substrate surface 304 at the point of the conduction path 306. In one embodiment, the conduction path 306 may comprise a layer of conductive material between about 10 micrometers and about 130 micrometers. Values outside this range may work in specific embodiments, and will depend upon the tensile strength, bonding strength, Young's modulus of the conductive material, and the like. Further, the material comprising the substrate 302 affects the force exerted on the conduction path 306 and the related thicknesses that are effective for a given embodiment of the apparatus 300. The illustrated values work for many ceramic based substrates and cermet, metal, and metal alloy conductive materials, and a simple test can verify other material combinations for a given embodiment of the apparatus 300.

The conduction path 306 may be configured to intersect a high-stress area of the aftertreatment device 106. "Intersection" of the high-stress area indicates that some portion of the conduction path 306 is within some portion of the high-stress area, although some of the conduction path 306 may be outside the high-stress area, and the conduction path 306 may not cover the entire high-stress area.

The high-stress area may comprise an area of the aftertreatment device 106 most likely to experience a stress-related failure. In one embodiment, the high-stress area comprises the central-rear portion of the aftertreatment device 106, where the "rear" indicates the downstream portion relative to the exhaust stream 104. For example, the high-stress area may comprise an area defined axially between a front boundary 309A about 3/10 of the axial distance from the front of the aftertreatment device 106 and a rear boundary 309B about 1/10 of the axial distance from the rear of the aftertreatment device 106. In the example, the high stress area comprises an axial position between about 0.3 X to 0.9 X, where X represents an axial position defined such that X=0 is an upstream end of the aftertreatment device 106, and X=1 is a downstream end of the aftertreatment device 106.

In one embodiment, the aftertreatment device 106 may comprise a cylindrical ceramic device 106 comprising a plurality of rectangular cells 310 and an outer wall 312. The high-stress area may further comprise the substrate surface 304 at an intersection 314 between one rectangular cell 316 and the outer wall 312 such that the intersected rectangular cell 316 is divided approximately diagonally by the outer wall 312.

Figure 4:
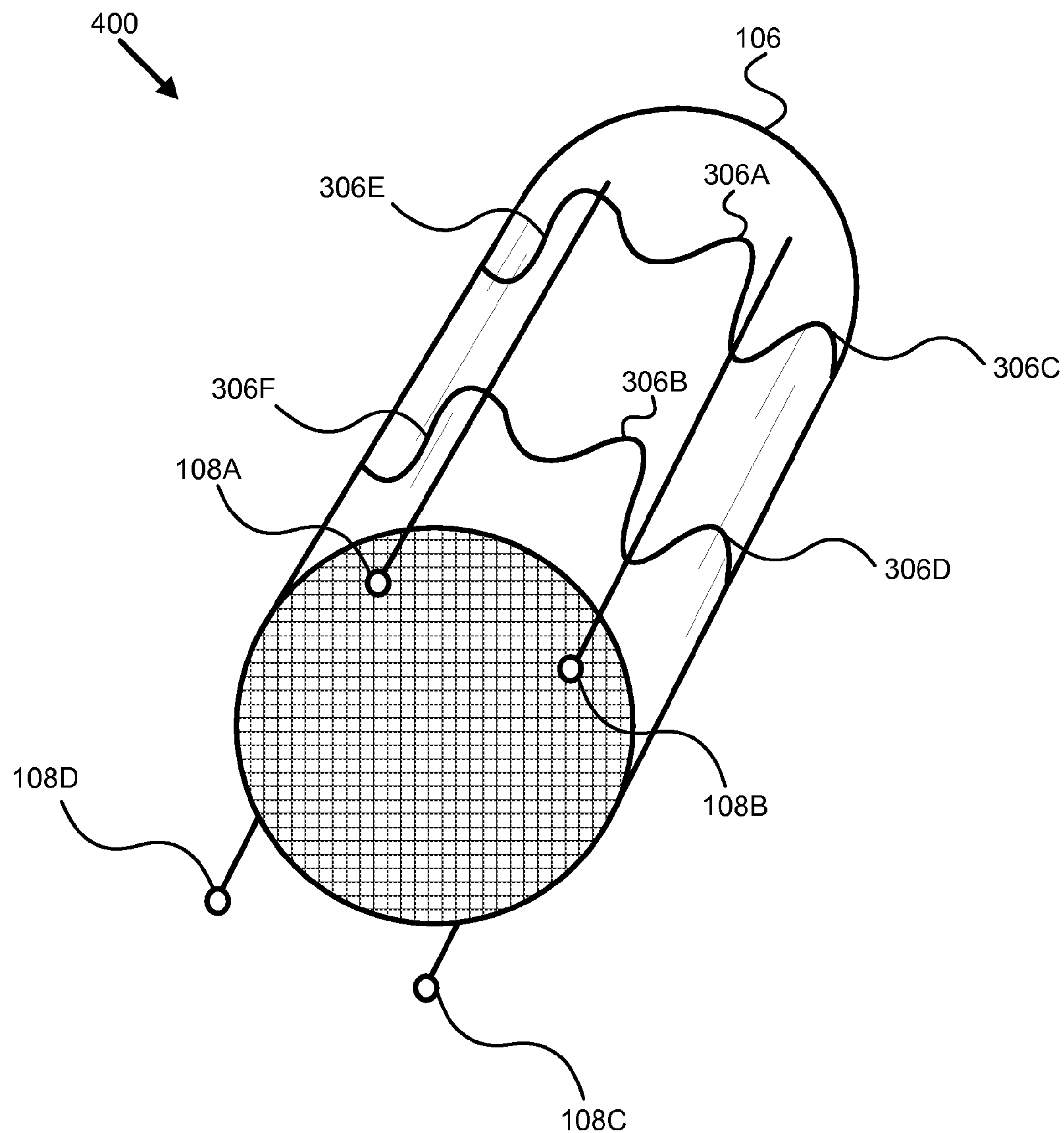
FIG. 4 is an illustration depicting an alternate embodiment of an apparatus for detecting cracking in an aftertreatment device in accordance with the present invention.

FIG. 4 is an illustration depicting an alternate embodiment of an apparatus 400 for detecting cracking in an aftertreatment device 106 in accordance with the present invention. The apparatus may comprise a plurality of parallel conduction paths 306 connecting at least two of the access points 108. Note that parallel herein refers to parallel conduction paths 306 in the electrical sense and not necessarily in the geometric sense. For example, the conduction paths 306A and 306B connect the access points 108A and 108B in parallel. A crack which propagates and breaks conduction path 306A will change the observed resistance between 108A-108B from $R_{AB}=(1/R_A+1/R_B)^{-1}$, to $R_{AB}=R_B$, where $R_{AB}$ is the observed resistance 108A-108B, $R_A$ is the resistance of the path 306A, and $R_B$ is the resistance of the path 306B. Likewise, in the illustration 400, the paths 306C-306D parallely connect access points 108B-108C, and the paths 306E-306F parallely connect access points 108A-108D.

In one embodiment, cracks on the substrate surface 304 of the aftertreatment device 106 tend to propagate in a radial manner around the device 106. Therefore, in the example, the paths 306A-306F meander axially as shown to give a better chance of intersecting radial cracks which may occur. The cross-paths which connect the access points 108A-108D to the conduction paths 306A-306F may be configured such that they do not break when a radial crack occurs. For example, the cross-paths may comprise a thicker conductive material than the conduction paths 306A-306F, and/or the cross-paths may not be bonded to the surface 304 of the aftertreatment device 106.

Figure 5:
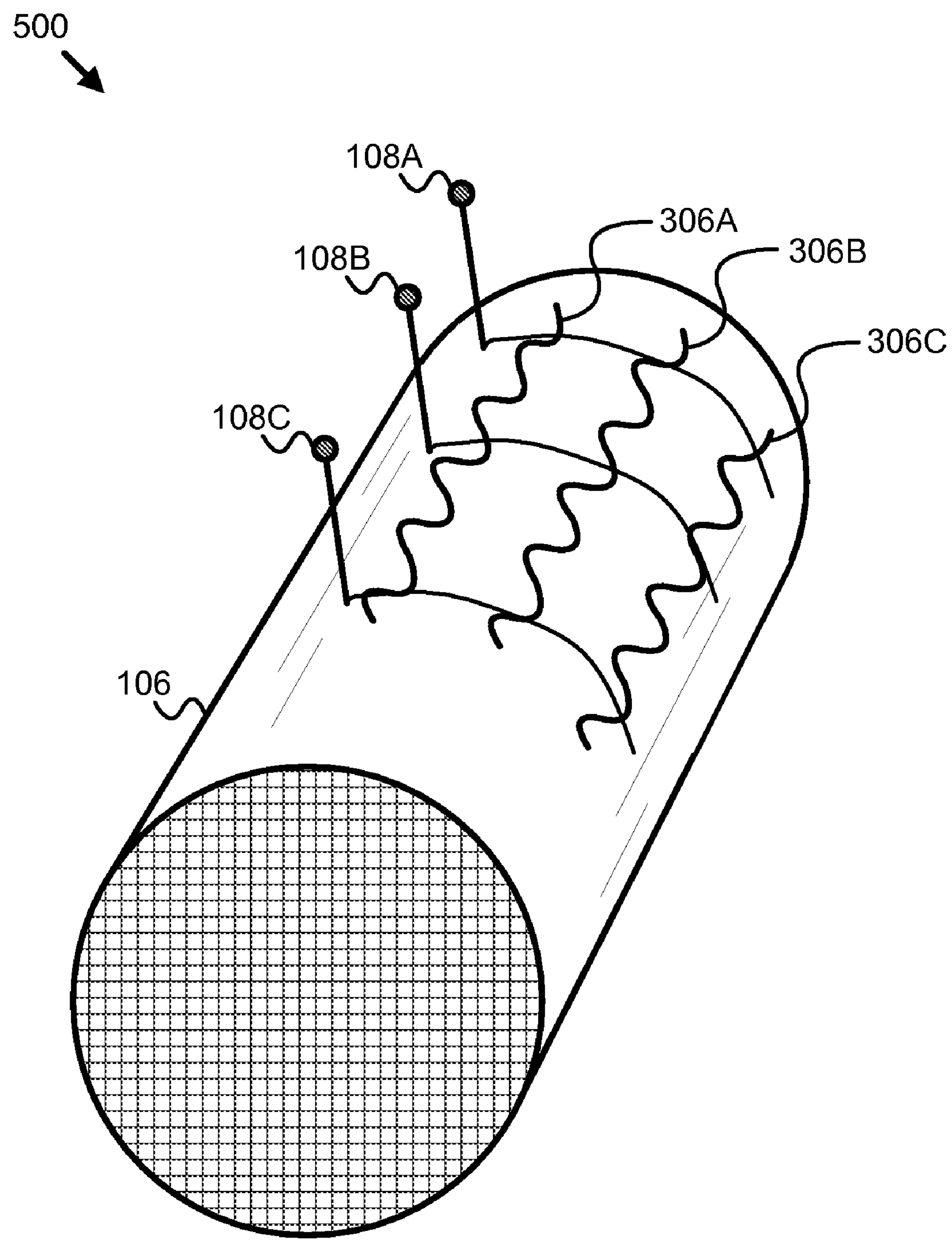
FIG. 5 is an illustration depicting an alternate embodiment of an apparatus for detecting cracking in an aftertreatment device in accordance with the present invention.

FIG. 5 is an illustration depicting an alternate embodiment of an apparatus 500 for detecting cracking in an aftertreatment device 106 in accordance with the present invention. The apparatus 500 may comprise a plurality of conduction paths 306A-306C connecting the access points 108A-108C. The conduction paths 306A-306C in FIG. 5 are shown oriented axially, while the paths 306A-306F in FIG. 4 are shown oriented radially. However, the conduction paths 306 may be oriented in any manner to cover the area of interest, which may be the high-stress area. For example, the conduction path(s) 306 may be oriented helically around the substrate surface 304.

Figure 6:
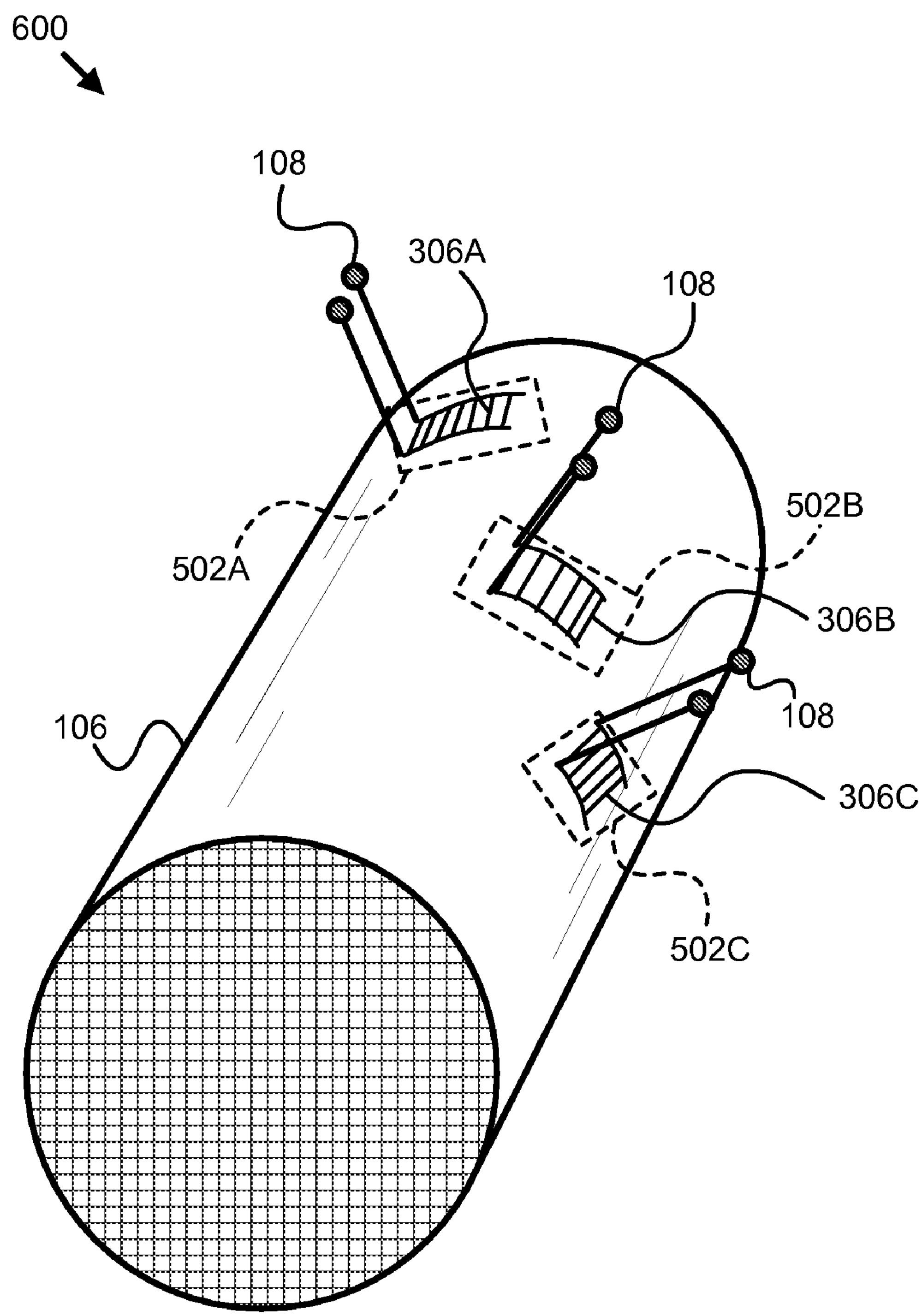
FIG. 6 is an illustration depicting an alternate embodiment of an apparatus for detecting cracking in an aftertreatment device in accordance with the present invention.

FIG. 6 is an illustration depicting an alternate embodiment of an apparatus 600 for detecting cracking in an aftertreatment device 106 in accordance with the present invention. The apparatus 600 comprises several sets of parallel conduction paths 306A-306C, which may be applied as a decal. A plurality of parallel conduction paths 306A may comprise an observed area 502A, or an area of coverage by the conduction paths 306A. The apparatus 600 may comprise a plurality of observed areas 502A, 502B, 502C.

The observed areas 502A-502C may be configured to measure a distinct axial portion of the aftertreatment device 106. A distinct axial portion of the aftertreatment device 106 may indicate that no axial overlap occurs between observed areas 502A-502C, and/or that only partial overlap occurs between observed areas 502A-502C. The observed areas 502A-502C may be configured to measure a distinct radial portion of the aftertreatment device 106. A distinct radial portion of the aftertreatment device 106 may indicate that no radial overlap occurs between observed areas 502A-502C, and/or that only partial overlap occurs between observed areas 502A-502C. The observed areas 502A-502C of the apparatus 600 are distributed axially and radially.

Figure 7A:
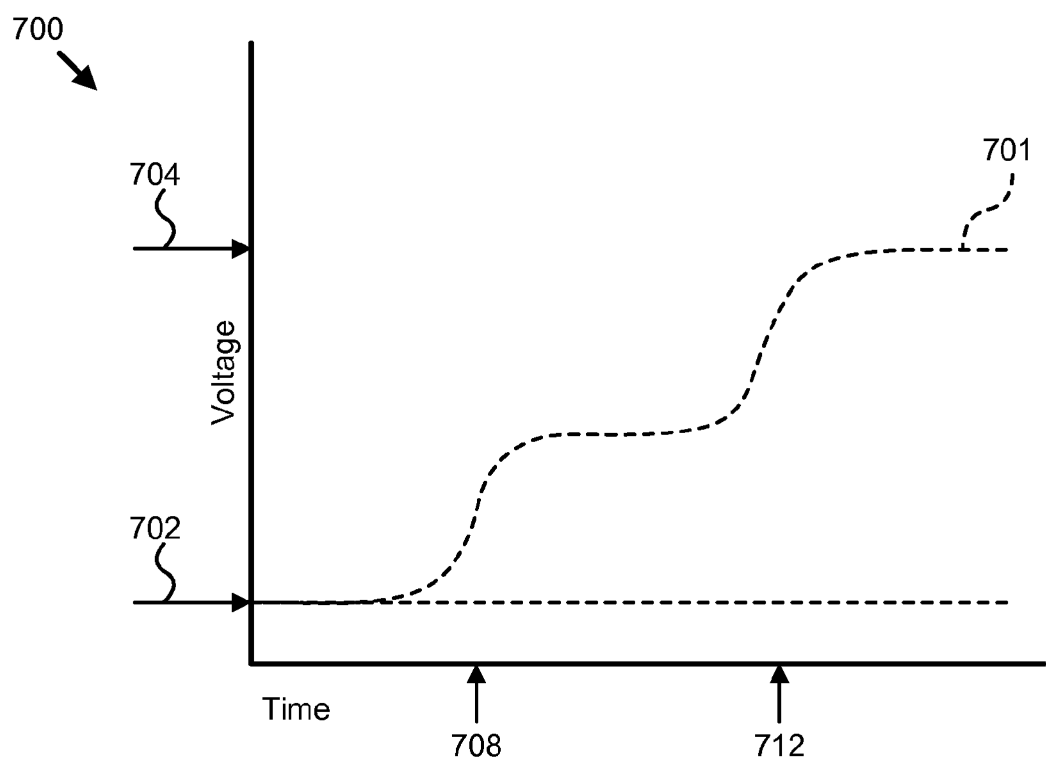
FIG. 7A is a graph depicting one embodiment interpreting a resistance value in accordance with the present invention.

FIG. 7A is a graph depicting one embodiment interpreting a resistance value 204 in accordance with the present invention. The resistance value 204 may be interpreted from a voltage value 701. The voltage 701 may begin at a baseline 702 at time zero, and the baseline voltage 702 may be consistent with an apparatus wherein all conduction paths 306 are intact. At time 708, a crack may occur that separates some conduction paths 306 and causes a voltage 701 increase due to the resistance value 204 between two access points 108 increasing. At time 712, a crack may occur that separates all remaining conduction paths 306 between the access points 308 and causes the voltage 701 to rise to a value consistent with an open circuit, which may be a supply voltage 704 from an ECM 110.

Figure 7B:
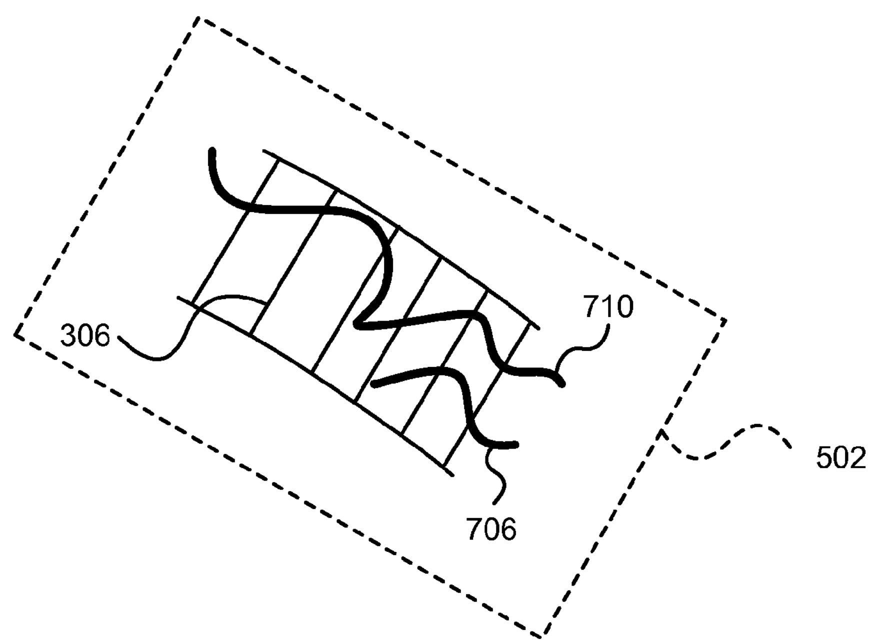
FIG. 7B is an illustration depicting one embodiment of a plurality of parallel conduction paths, depicting propagated cracks, in accordance with the present invention.

FIG. 7B is an illustration depicting one embodiment of a plurality of parallel conduction paths 306, depicting propagated cracks, in accordance with the present invention. The illustration of FIG. 7B may be consistent with the voltage curve 701 of FIG. 7A. At time zero, the conduction paths 306 may be intact. A crack 706 may occur at time 708 causing an observed voltage 701 rise. A crack 710 may occur at time 712, which may separate all conduction paths 306 and cause the observed voltage 701 rise to the supply voltage 704.

The schematic flow chart diagram included herein is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
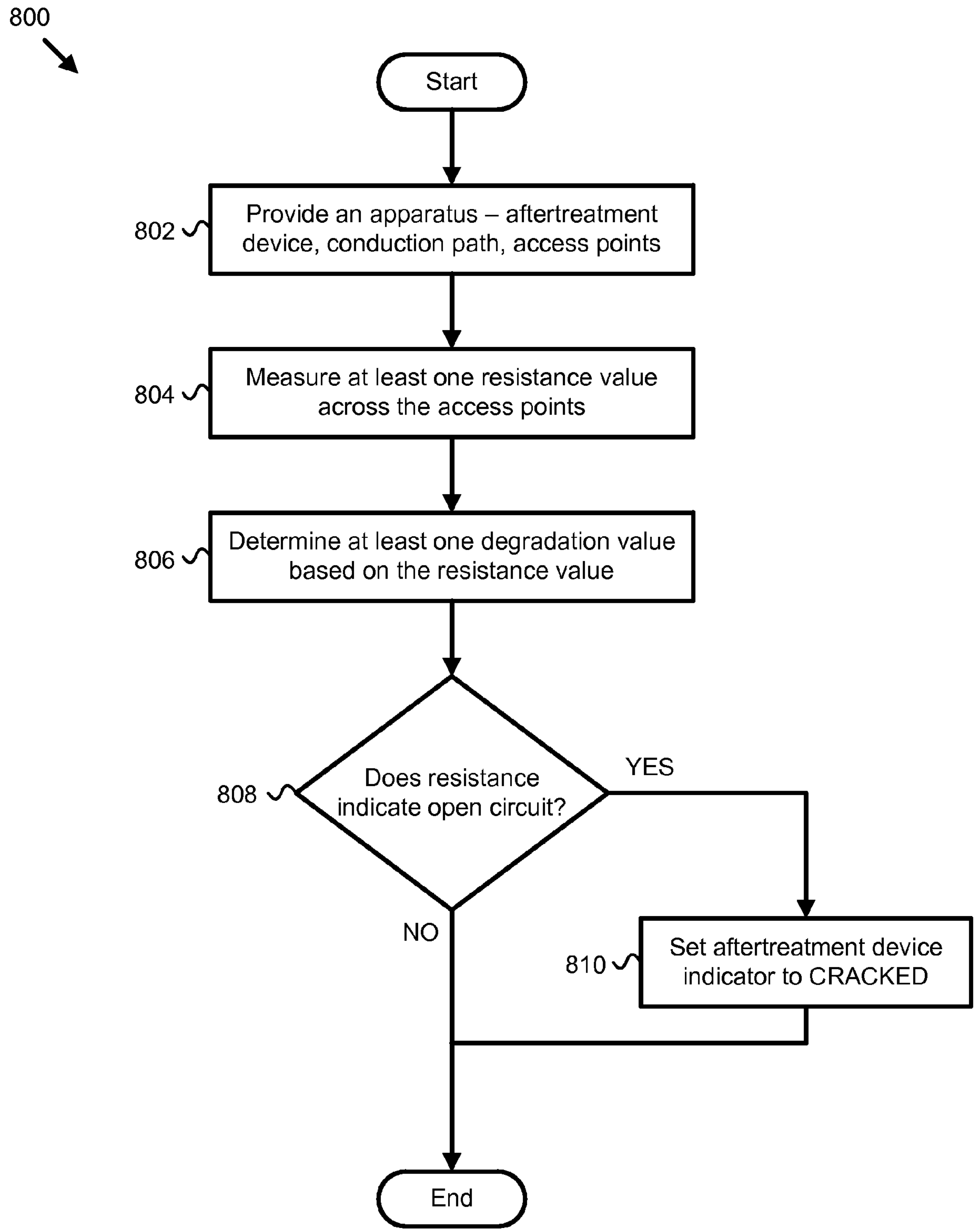
FIG. 8 is a schematic flow diagram illustrating one embodiment of a method for detecting fractures in an aftertreatment device in accordance with the present invention.

FIG. 8 is a schematic flow diagram illustrating one embodiment of a method 800 for detecting fractures 706, 710 in an aftertreatment device 106 in accordance with the present invention. The method 800 may include providing 802 an apparatus comprising an aftertreatment device 106 comprising a substrate 302 and a substrate surface 304, a conductive material forming at least one conduction path 306 bonded to the substrate surface 304, and a plurality of access points 108 conductively coupled to the conduction path(s) 306.

The method 800 may further include a controller 110 and/or service technician measuring 804 at least one resistance value 204 between two of the access points 108. A degradation module 206 may determine at least one degradation value 208 based on the resistance value 204. The degradation module 206 may be configured to determine the aftertreatment device 106 is cracked when the resistance value 204 is consistent with an open circuit by checking 808 whether the resistance value 204 indicates an open circuit, and setting 810 an aftertreatment device indicator 208 to "CRACKED" if the check 808 is positive.

Figure 9:
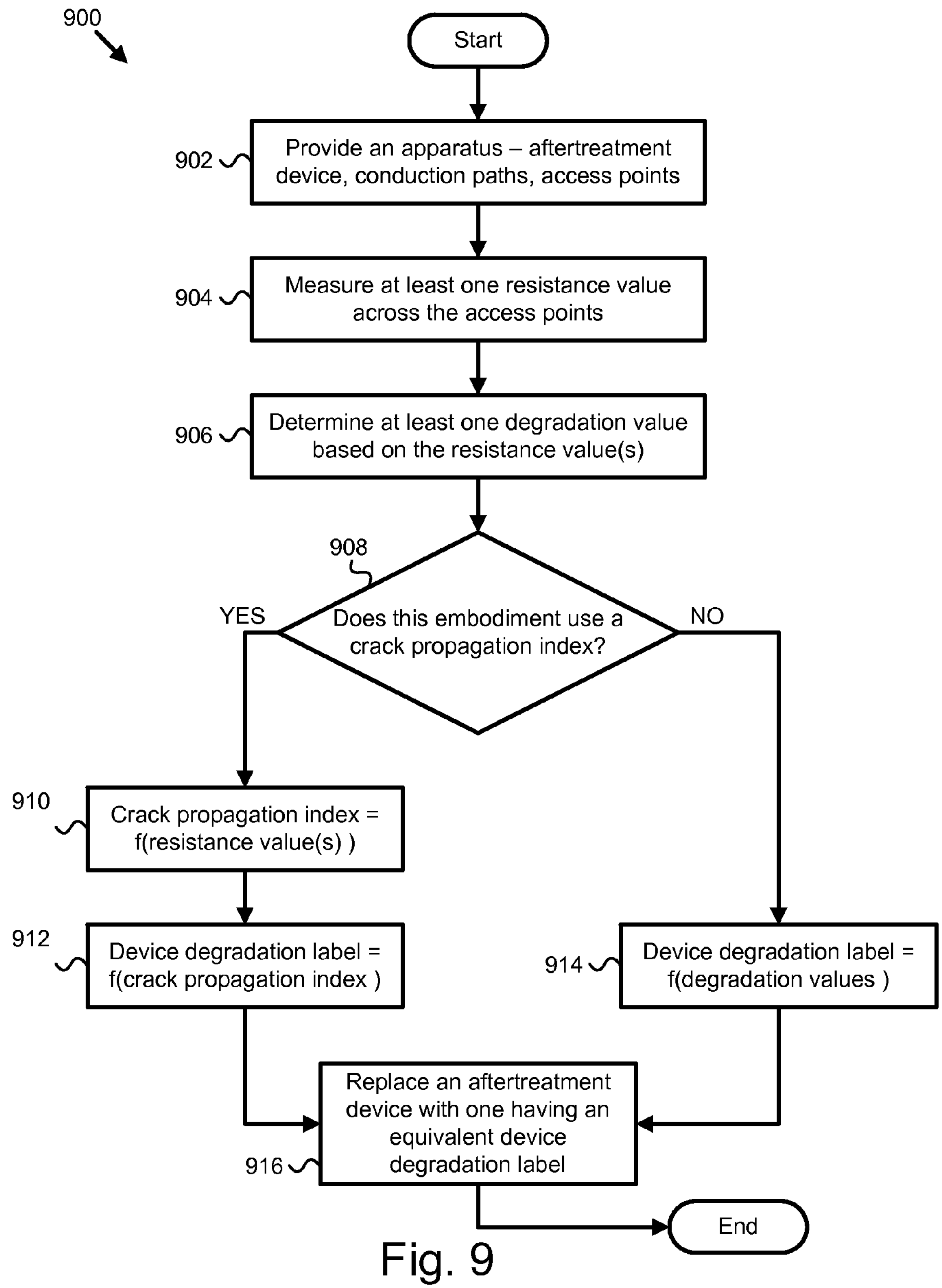
FIG. 9 is a schematic flow diagram illustrating an alternate embodiment of a method for detecting fractures in an aftertreatment device in accordance with the present invention.

FIG. 9 is a schematic flow diagram illustrating an alternate embodiment of a method for detecting fractures 706, 710 in an aftertreatment device 106 in accordance with the present invention. The method 900 may include providing 902 an apparatus comprising an aftertreatment device 106 comprising a substrate 302 and a substrate surface 304, a conductive material forming a plurality of conduction paths 306 bonded to the substrate surface 304, and a plurality of access points 108 conductively coupled to the conduction paths 306.

The method 900 may further include a controller 110 and/or service technician measuring 904 at least one resistance value 204 between two of the access points 108. A degradation module 206 may determine 906 at least one degradation value 208 based on the resistance value 204. The degradation module 206 may determine 906 a plurality of degradation values 208 corresponding to a plurality of observed areas 502. In one embodiment, the method 900 may include checking 908 whether the embodiment utilizes a crack propagation index as a degradation value 208.

If the check 908 is negative, the labeling module 210 may set 914 the device degradation label 914 based on the plurality of degradation values 208—for example as a function of a lookup table with the degradation values 208 as an input, and a device degradation label 212 as an output. If the check 908 is positive, the degradation module 206 may set 910 a crack propagation index 208 as a function of the resistance value(s) 204, and the labeling module 210 may set 912 the device degradation label 212 as a function of the crack propagation index 208. The method 900 may include a service technician replacing 916 an aftertreatment device 106 with a second aftertreatment device 106 having an equivalent device degradation label 212 in response to a service event. The aftertreatment device 106 may comprise a particulate filter configured to remove soot from the exhaust stream 104.

From the foregoing discussion, it is clear that the invention provides a system, method, and apparatus for detecting cracks in an aftertreatment device. The invention further provides for passive detection of cracks without input from a service technician, and allows a service technician to replace an aftertreatment device with one having similar degradation characteristics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for detecting cracking in an aftertreatment device, the apparatus comprising:

an aftertreatment device comprising a substrate and a substrate surface;

a conductive material forming at least one conduction path bonded to the substrate surface;

a plurality of access points conductively coupled to the at least one conduction path;

a degradation module that determines at least one degradation value for the aftertreatment device, the degradation value being based on a resistance value across the at least one conduction path; and an event detection module that determines a degradation event on the aftertreatment device based at least partially on a high temperature event experienced by the aftertreatment device.

2. The apparatus of claim 1, wherein the at least one conduction path comprises a decal of the conductive material applied to the substrate surface.

3. The apparatus of claim 1, wherein the at least one conduction path comprises the conductive material applied by one of painting and printing on the substrate surface.

4. The apparatus of claim 1, further comprising a resistance module that interprets a resistance value across the at least one conduction path between at least two of the plurality of access points.

5. The apparatus of claim 4, further comprising a labeling module that generates a device degradation label for the aftertreatment device based on the at least one degradation value.

6. The apparatus of claim 1, wherein the conductive material comprises a member formed from the group consisting of a conductive metal, a conductive metal alloy, a resistive layer, and a cermet.

7. The apparatus of claim 6, wherein the conductive material is baked onto the substrate surface at about 850 degrees C during the manufacture of the apparatus.

8. The apparatus of claim 1, wherein the at least one conduction path comprises the conductive material applied at a thickness between about 10 micrometers and about 130 micrometers.

9. The apparatus of claim 1, wherein the at least one conduction path is configured to intersect a high-stress area of the aftertreatment device, the high-stress area of the aftertreatment device comprising an axial position between about 0.3 X to about 0.9 X, wherein X represents an axial position defined such that X=0 is an upstream end of the aftertreatment device, and X=1 is a downstream side of the aftertreatment device.

10. The apparatus of claim 9, wherein the aftertreatment device comprises a cylindrical ceramic device comprising a plurality of rectangular cells and an outer wall, and wherein the high-stress area further comprises the substrate surface at an intersection between one of the rectangular cells and the outer wall such that the intersected rectangular cell is divided approximately diagonally by the outer wall.

11. The apparatus of claim 1, wherein the at least one conduction path comprises a plurality of parallel conduction paths connecting at least two of the access points.

12. The apparatus of claim 11, wherein the plurality of parallel conduction paths connecting at least two of the access points comprises an observed area, the apparatus further comprising a plurality of observed areas.

13. The apparatus of claim 12, wherein each of the plurality of observed areas is configured to measure a distinct axial portion of the aftertreatment device.

14. The apparatus of claim 12, wherein each of the plurality of observed areas is configured to measure a distinct radial portion of the aftertreatment device.

15. The apparatus of claim 4, wherein the at least one conduction path comprises a plurality of parallel conduction paths connecting at least two of the access points, the apparatus further comprising a cracking history module configured to store a plurality of degradation values at specified time intervals.

16. The apparatus of claim 4, wherein the at least one conduction path comprises a plurality of parallel conduction paths connecting at least two of the access points, the apparatus further comprising a cracking history module that stores a pre-event degradation value and a post-event degradation value in response to each degradation event occurrence.

17. A method of detecting fractures in an aftertreatment device, the method comprising:

providing an apparatus comprising: an aftertreatment device comprising a substrate and a substrate surface, a conductive material forming at least one conduction path bonded to the substrate surface, and a plurality of access points conductively coupled to the at least one conduction path;

measuring resistance values between two of the plurality of access points;

determining a plurality of degradation values for the aftertreatment device based on the resistance values, wherein the plurality of degradation values are determined at predetermined time intervals; and predicting at least one degradation event on the aftertreatment device, wherein the predetermined time intervals are based on an estimated duration of the predicted at least one degradation event on the aftertreatment device.

18. The method of claim 17, wherein determining at least one degradation value for the aftertreatment device based on the at least one resistance value comprises determining the aftertreatment device is cracked when the resistance value is consistent with an open circuit.

19. The method of claim 17, wherein the at least one conduction path comprises a plurality of parallel conduction paths connecting at least two of the access points, and wherein determining at least one degradation value for the aftertreatment device based on the at least one resistance value comprises determining a crack propagation index based on the resistance value.

20. The method of claim 19, further comprising determining a device degradation label based on the crack propagation index.

21. The method of claim 20, wherein the aftertreatment device comprises a particulate filter, the method further comprising replacing the particulate filter with a second particulate filter comprising an equivalent device degradation label in response to a service event.

22. The method of claim 19, wherein the plurality of parallel conduction paths connecting at least two of the access points comprises an observed area, the apparatus further comprising a plurality of observed areas, and wherein determining a crack propagation state of the aftertreatment device comprises determining a plurality of degradation values corresponding to the plurality of observed areas.

23. The method of claim 22, further comprising determining a device degradation label based on the plurality of degradation values.

24. A system for detecting cracking in an aftertreatment device, the system comprising:

an aftertreatment device configured to treat exhaust gas from an internal combustion engine, the aftertreatment device comprising a substrate and a substrate surface;

a conductive material forming at least one conduction path bonded to the substrate surface;

a plurality of access points conductively coupled to the at least one conduction path;

an event detection module that determines a degradation event on the aftertreatment device;

a degradation module that determines a plurality of degradation values for the aftertreatment device, wherein each degradation value is based on a resistance value across the at least one conduction path; and a cracking history module that stores a rolling buffer of the determined degradation values, wherein degradation values determined during a predetermined time period prior to the degradation event are stored as a pre-event degradation value and degradation values determined during a predetermined time period after the degradation event are stored as a post-event degradation value, wherein crack detection is based at least partially on a comparison between the pre-event and post-event degradation values.

25. The system of claim 24, further comprising a service tool comprising a resistance module that interprets a resistance value across the at least one conduction path.

26. The system of claim 24, further comprising an electronic control module (ECM) comprising a resistance module that interprets a resistance value across the at least one conduction path.

27. The system of claim 26, wherein the ECM further comprises a fault module that sets a fault indicator based on the at least one degradation value.

* * * * *